United States Patent [19]
Matsumoto

[11] 3,836,257
[45] Sept. 17, 1974

[54] METHOD FOR OPTICAL DETECTION AND/OR MEASUREMENT OF MOVEMENT OF DIFFRACTION GRATING
[75] Inventor: Kazuya Matsumoto, Kanagawa-ken, Japan
[73] Assignee: Canon Kabushiki Kaisha, Tokyo, Japan
[22] Filed: Nov. 20, 1972
[21] Appl. No.: 308,124

Related U.S. Application Data
[62] Division of Ser. No. 104,006, Jan. 5, 1971, Pat. No. 3,726,595.

[52] U.S. Cl. ............................................. 356/111
[51] Int. Cl. ............................................ G01b 9/02
[58] Field of Search.................... 356/110, 111, 106

[56] References Cited
UNITED STATES PATENTS
3,169,193  2/1965  Strang................................ 356/110

Primary Examiner—Ronald L. Wibert
Assistant Examiner—Conrad Clark
Attorney, Agent, or Firm—Toren, McGeady & Stanger

[57] ABSTRACT

A method for optical detection and/or measurement of movement of a diffraction grating which is characterized in that the vertical movement of the diffraction grating in respect to a standard parallel beam is detected based on variation in interference fringes produced by diffracted waves from the grating moving in the standard parallel beams.

4 Claims, 17 Drawing Figures

METHOD FOR OPTICAL DETECTION AND/OR MEASUREMENT OF MOVEMENT OF DIFFRACTION GRATING

This is a divisional application of pending prior application Ser. No. 104,006 filed on Jan. 5, 1971 now U.S. Pat. No. 3,726,595.

BACKGROUND OF THE INVENTION

The present invention relates to a new method for optical detection and high accuracy measurement of movement of objects to be measured. The invention particularly relates to a method for optical detection and measurement of movement of a diffraction grating, which is characterized in that the vertical movement of the diffraction grating in respect to a standard parallel beam is detected based on variation in interference fringes produced by diffracted waves from the grating moving in the standard parallel beams.

Therefore, the present inventive method concerns the measurement of eccentricity of the object to be measured, and measurement of waving or angular deviation in a plane of a linearly sliding object to be measured in respect to the standard parallel beams, which waving or angular deviation has hitherto been impossible to measure precisely. Furthermore the inventive method is very effective in adjustment for coinciding a mechanical axis and an optical axis with high accuracy as the inventive method makes it possible to detect the movement of the grating by means of the grating itself based on the standard parallel beams.

The principle of the inventive method will be explained particularly in case of a rectangular distribution of transmittance of the grating. The transmittance or reflectance distribution of the diffraction grating is generally expressed in the following developed equation of Fourier series:

$$T(x) = \infty/\Sigma am \cos (2\pi mNxl)$$

$$m = 0$$

(1)

where $T(x)$ is the transmittance of the diffraction grating, $X$ is a coordinate taken in the grating surface, $N$ is the number of the grating per milimeter in an $X$ direction (effective grating constant), and $m$ is an integer.

In case the diffraction grating is moved by $\Delta X$ in the $X$ direction and is illuminated by a parallel wave, the diffracted wave $U(x)$ is given by the following equation:

$$U(x) = 1/2 \, \infty/\Sigma \, am \, \exp [i2\pi mN(X-\Delta X]$$

(2)

$$m = -\infty$$

By putting $$2\pi mN = 2\pi/\lambda \sin \theta m$$

in which $\lambda$ is a wave length of the illumination light for the grating, in equation (2), the latter is $$U(x) = 1/2 \, \infty/\Sigma \, am \, \exp [i\, 2\pi/\lambda \sin \theta m \cdot (X - \Delta X)]$$

(3)

$$m = -\infty$$

From the equation (3), $$am \exp [i\, 2\pi/\lambda \sin \theta m \cdot (X - \Delta X)]$$

represents the plain wave directing toward $\theta m = \sin^{-1}(mN\lambda)$, and the plain wave has a phase delay of $2\pi/\lambda \sin\theta m \cdot \Delta X$. $\theta_o$ shows the direction of a zero-ordered diffraction, which direction is same as that of the illumination wave. Fringe intensity distribution $F_1(p,q)$ for the diffracted wave or $p$-order and that of $q$-order is shown by the following equation:

$$F_1(p,q) = 1 + \cos 2\pi/\lambda(p - q) N\Delta X$$

(4)

In equation (4), if $||p - q|| = 1$,
$$F_1(p,q : ||p - q|| = 1 + \cos (2\pi/\lambda \, N\Delta X)$$

(5)

The intensity distribution expressed by the equation (5) is equivalent to that of conventional Moire fringes.

On the contrary, if $||p - q|| = \mu$, and $\mu \neq 1$, the fringe intensity distribution for waves of different order is expressed by the following equation:

$$F_1 (p,q : ||p - q|| \neq 1) = 1 + \cos (2\pi/\lambda\mu \, N\Delta X)$$

(6)

Comparing the equation (5) and the equation (6), the amount of fringe movement of the equation (6) is $\mu$ times of that of the equation (5) for the same amount of diffraction movement $\Delta X$. For example, when $p = 5$ and $q = -5$, that is $\mu = 10$, detection sensitivity increases by 10 times as compared with that of the conventional Moire method.

As understood from the above description, the movement of the grating in a direction of the illumination light has no effect on the measurement result.

Particularly when two illumination beams are arranged so that the diffracted waves of $p$-order and $q$-order have the same direction, that is $\theta p - 0$ and $\theta q = 0$, the fringe distribution $F_2 (p,q)$ as expressed by the following equation similar to the equation (4) is observed.

$$F_2(p,q) = 1 + \cos 2\pi/\lambda \, (p - q) \, N \, (\chi - \Delta\chi) + \Sigma p - \Sigma q$$

(7)

in where $\Sigma p$ and $\Sigma q$ show respectively the phase variation appearing in diffracted waves of $o$-order and $q$-order respectively when the grating is moved by a distance d along the standard beam from its reference position. And the phase variation for the diffracted wave of $m$-order is expressed as below:

$$\Sigma m = \pi/\lambda \, (pN)^2 d$$

(8)

If $p = -q$, that is, the diffracted waves have symmetrical relations to each other, $\Sigma p - \Sigma q = 0$ $$F_2(p,q : p = -q) = 1 + \cos 4\pi/\lambda \, pN(\chi - \Delta\chi)$$

(9)

Also in this case, the fringe distribution for the diffracted waves of symmetrical relation as expressed by the equation (9), the movement of the grating in a direction of the illumination has no effect on the measurement result, the vertical movement in amount of $\Delta X$ of the grating has effect on the measurement result.

Furthermore, according to the present inventive method, it is possible to vary detection sensitivity by varying wave length of the illumination light or by varying the effective grating constant $N$ through the rotation of the grating or through the pitch variation of the grating. Therefore, for example, the detective range may be broadened even by a single measuring machine.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 4-1 is a schematic diagram illustrating the principle of the present invention;

FIG. 4-2 shows a diffraction pattern obtained according to the principle shown in FIG. 4-1;

FIG. 6-1 shows a modification of the grating shown in FIG. 5;

FIG. 6-2 shows diffraction patterns corresponding to the grating shown in FIG. 6-1;

FIG. 8-1 is a schematic view of a second embodiment according to the present invention;

FIG. 8-2 shows a construction of the beam extractor used in the second embodiment shown in FIG. 8-1.

DETAILED DESCRIPTION OF THE INVENTION

Figure 1:
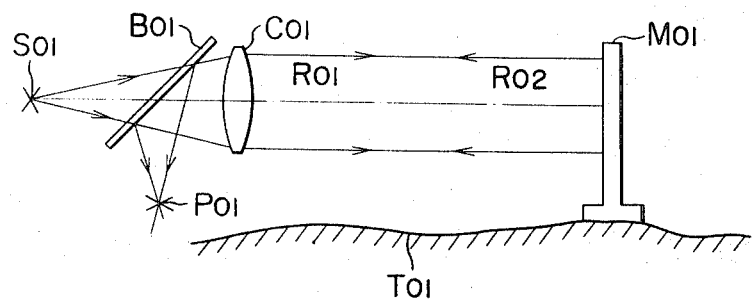
FIGS. 1, 2-1 and 2-2 are schematic views of measurement devices for a conventional optical measurement.

FIG. 1 shows a conventional device with an automatically collimated beam $Ro_1$ and $Ro_2$.

As shown, the beams $Ro_1$ from a reference line $So_1$ becomes parallel through a collimeter lens $Co_1$, and a moving mirror $Mo_1$ is positioned in the standard parallel beams, which mirror $Mo_1$ moves in contact with a plane of a sliding object $To_1$ to be measured, and whereby the mirror $Mo_1$ is tiltable to deflect the waving of the plane of the sliding object $To_1$. The mirror tilt causes the movement of an image $Po_1$ of the reference line $So_1$, which image is produced through a beam splitter $Bo_1$. Based on the image movement, the waving of the plane of the sliding object $To_1$ is detected and measured. This conventional method makes it possible to detect the waving of the plane of a sliding object, or a tilt error, but does not make it possible to detect a uniform angular deviation of the plane of the sliding object in respect to the parallel beams.

Figures 1, 2:
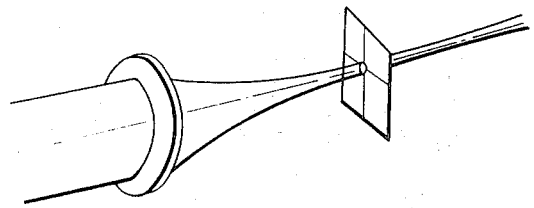
Figure 2:
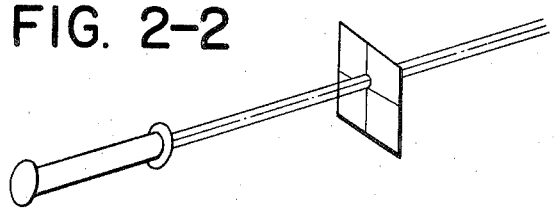
Figure 3:
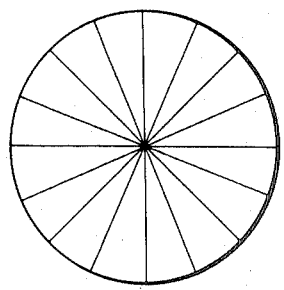
FIG. 3 is a Siemens-star for a conventional rotation meter.

As for the measurement of a uniform angular deviation of the plane of the sliding object in respect to an optical aixs, an axicon lens is used as shown in FIG. 2-1 or a laser beam is used to measure the uniform angular deviation based on an amount of lateral shear of the laser beam as shown in FIG. 2-2. Either of the above measurements, however, is not appropriate for an accurate measurement. And for measurement of rotation speed of a rotating object, it has been conventional practice to attach a radial chart called a Siemens-star as shown in FIG. 3 on the rotating object. In this conventional measurement, however, it is necessary to align the rotation center of the rotating object with the center of the radial chart, and mis-alignment due to improper adjustment causes measurement errors.

Figure 5:
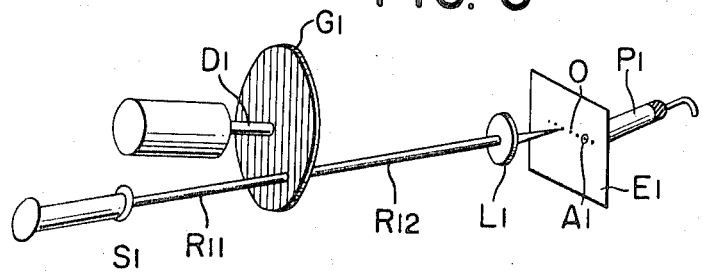
FIG. 5 shows an optical arrangement of a first embodiment, a rotation meter according to the present invention.

The first embodiment shown in FIG. 5 is characterized in that the necessity of adjustment for alignment of the rotation center and the chart center is eliminated and thus the arrangement is simplified and completely free from the mis-alignment errors.

Generally speaking, a Fraunhoffer diffraction pattern of an object has the following properties.

1. The diffracted pattern is variable irrespective of the movements in lateral, longitudinal back and forth direction of the object.
2. The diffraction pattern rotates in response to the rotation of the object.

The first embodiment is based on the above properties and relates to a rotation speed meter of a rotating object.

Figures 1, 4:
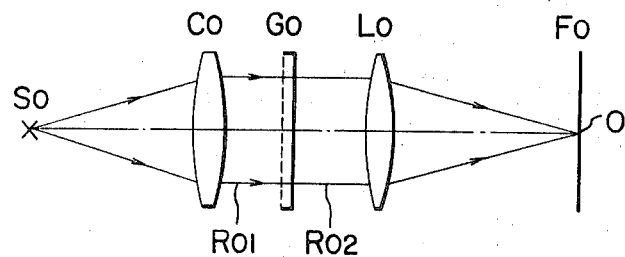
Figures 2, 4:
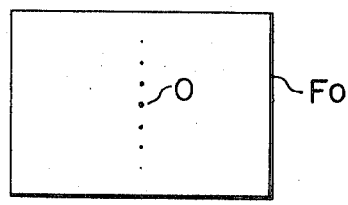

Suppose that the object in a grating and diffraction pattern is produced by the optical arrangement shown in FIG. 4-1. A parallel beam $Ro_1$ from a light source $So$ through a collimeter lens $Co$ illuminates the grating $Go$. The waves $Ro_2$ diffracted from the grating $Go$ enter a lens $Lo$ positioned after the grating $Go$ to form a Fraunhoffer diffraction pattern on the focus plane $Fo$ of the lens $Lo$. The diffraction pattern is composed of a series of points on a straight line as shown in FIG. 4-2. In this arrangement, the diffraction pattern appearing on the focus plane is invariable due to the property (1) even when the diffraction grating $Go$ moves in lateral, longitudinal back and forth directions.

On the contrary, when the diffraction grating is rotated, the diffraction pattern rotates around an image point O, which corresponds to a point where the light focuses in case no grating is positioned, of O-order spectrum of diffraction irrespective of the rotation center of the grating.

In this case, only a rotation component is extracted and observed even if the rotation center is not adjusted because of the property (1).

In the first embodiment shown in FIG. 5 the grating $G_1$ which is attached to a rotational drive shaft $D_1$ of a rotating object such as a motor is illuminated by a beam $R_{11}$ from a laser device $S_1$ to form a diffraction pattern on a focus plane $E_1$ of a lens $L_1$. On this focus plane $E_1$ is provided a pinhole $A_1$ for observation or detection, and a photo-detector $P_1$ is provided behind the pinhole $A_1$. When the grating is rotated, the diffraction pattern also rotates around an image point O of O-order spectrum of diffraction so that diffracted beams $R_{12}$ pass through the lens $L_1$ and enters the pinhole $A_1$ intermittently. As a result, a pulse train from the photo-detector is obtained and the rotation speed is detected and measured.

Figures 1, 6:
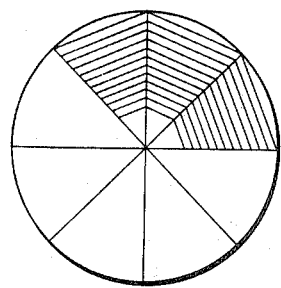
Figures 2, 6:
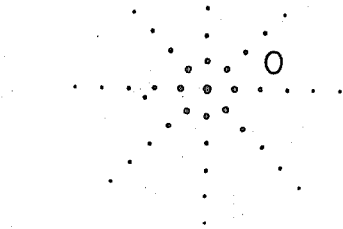

For improvement of accuracy in the measurement, plural grating portions may be so arranged that the diffraction directions of the grating portions are different from one another to result in a grating construction as shown in FIG. 6-1 and a Fraunhoffer diffraction pattern of these grating portions as shown in FIG. 6-2 in case the illumination beam $R_{11}$ covers all grating portions.

By use of the grating as shown in FIG. 6-1 the accuracy in the rotation speed measurement increases by four times.

Even when the grating as shown in FIG. 6-1 is used in place of the grating $G_1$ in the embodiment shown in FIG. 5, that is even when the grating is not fully illuminated, the accuracy in the measurement increases by 4 times as the diffracted beam toward the pinhole $A_1$ is effectively assured by the partial illumination.

Figure 7:
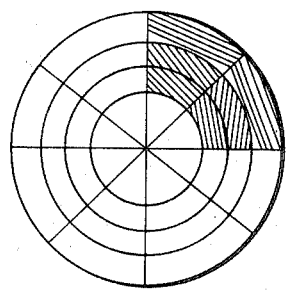
FIG. 7 is another modification of the diffraction grating shown in FIG. 5.

The arrangement of the grating portions shown in FIG. 7 is further effective for the improvement of accuracy in the measurement as the grating portions are divided not only in angular direction but also in a radial direction.

The optical arrangement for the inventive method should not be limited to that shown in FIG. 5, but it may be any arrangement which results in a Fraunhoffer diffraction pattern, and the grating may be transmissive or reflective.

Figures 2, 8:
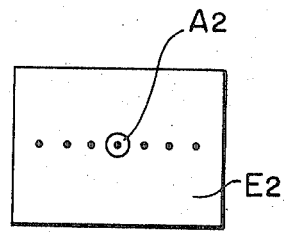
Figures 1, 8:
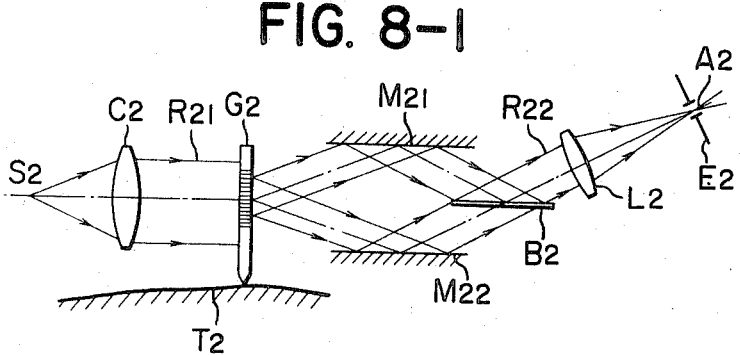

The second embodiment shown in FIG. 8-1 is for the measurement of straightness of an object $T_2$ to be measured. A grating $G_2$ which moves along the surface of the object $T_2$ is illuminated by a parallel beam $R_{21}$ from a point light source $S_2$ through a collimeter lens $C_2$. Among many diffracted waves from this grating $G_2$, a pair of beams symmetrical to each other are folded with the aid of mirrors $M_{21}$ and $M_{22}$ so as to be aligned in their directions.

The folded pair of beams $R_{22}$ are extracted by an extracting plate $E_2$ having a pinhole $A_2$ as shown in FIG. 8-2 for extracting and permitting the passage of only the pair of beams among the many diffracted waves with the aid of a lens $L_2$ which focuses only the pair of beams at the pinhole $A_2$.

The fringe is observed behind the pinhole $A_2$. This fringe is invariable when the grating $G_2$ moves in the same direction as that of the parallel beam $R_{21}$, but it varies in its intensity distribution when the grating moves in a direction vertical to the parallel beam $R_{21}$ in correspondence with the amount of the movement. Thus the straightness or flatness of the surface of the object $T_2$ is detected and measured from the variation in the fringe intensity.

Figure 9:
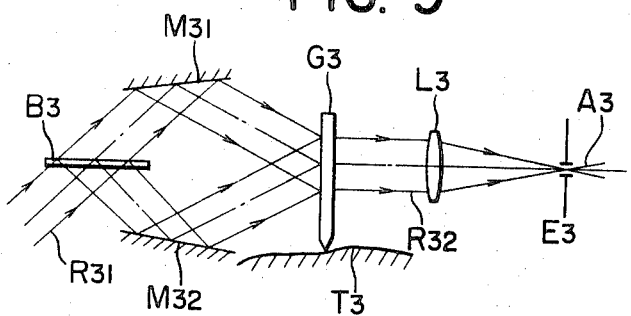
FIGS. 9, 10, 11, 12 and 13 are modifications of the second embodiment shown in FIG. 8-1.
Figure 10:
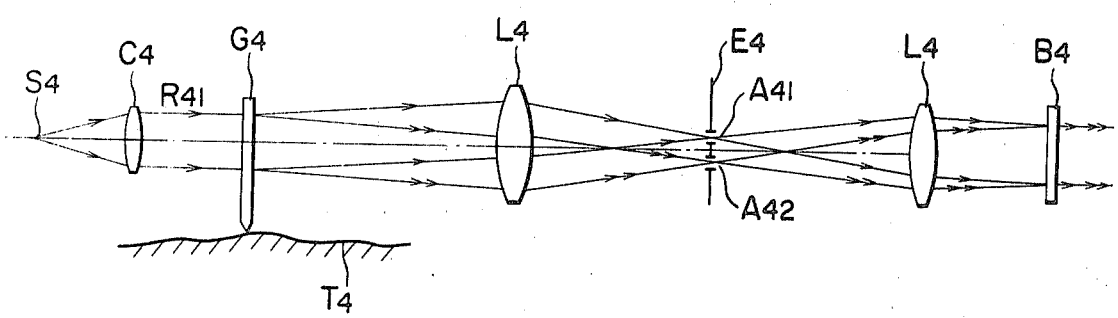

For the folding of a pair of beams diffracted from the grating and having the symmetrical relation with each other arrangements other than the arrangement shown in FIG. 8-1 may be used in place thereof as shown in FIGS. 9 and 10.

As clearly understood from the equation (9), the higher the diffraction order p is, the higher the accuracy of the measurement.

The arrangements shown in FIGS. 8-1, 9 and 10 make it possible to obtain an absolute deviation from the standard parallel beam of a grating by the grating itself to assure a high degree of accuracy. In contrast to the conventional measuring method in which the straightness is deflected from waviness measurement of the surface to be measured, the present inventive method makes it possible to detect and measure the deviation angle between the standard parallel beam and the linear plane of a sliding object, that is, the passage of the grating edge. The above deviation angle has hitherto been difficult to measure with high accuracy.

In FIG. 9 $R_{31}$ is an illumination parallel wave, $M_{31}$ and $M_{32}$ are mirrors, $B_3$ is a beam splitter, $G_4$ is a grating which slides on a test object $T_3$, $L_3$ is an imaging lens, $A_3$ is a pinhole of an extracting plate $E_3$, $R_{32}$ is a pair of folded and diffracted waves from the grating $G_3$ which is illuminated by two beams.

Next in FIG. 10, two gratings $G_4$ and $B_4$ are used. Parallel beams $R_{41}$ from a point light source $S_4$, collimated by a collimeter lens $C_4$ illuminate the grating $G_4$ which moves in contact with an object $T_4$ to be diffracted from the grating $G_4$.

For the extraction of a pair of diffracted beams, the diffracted waves are led through a lens $L_4$ and an extracting plate $E_4$ having pinholes $A_{41}$ and $A_{42}$. For the folding of the pair of extracted beams thereafter, the extracted beams pass through a lens $L_4$ and a grating $B_4$ having the same pitch as that of the grating $G_4$. Thus folded beams from the grating $B_4$ give fringes for observation.

Figure 11:
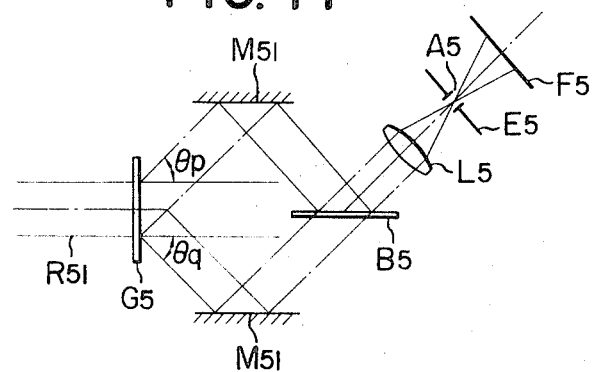
Figure 12:
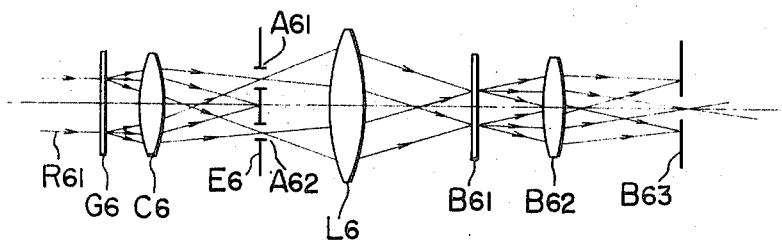
Figure 13:
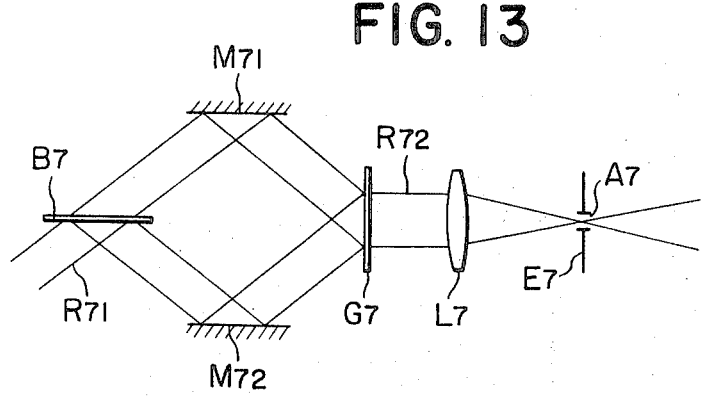

The modifications shown in FIGS. 11 to 13 are very effective, even without a laser device, for application to a measuring machine having a similar accuracy of measurement to measuring machines provided with a laser device, and can avoid complicated construction and adjustment as in the case of the measuring machine provided with the laser device.

As shown in FIG. 11, the grating $G_5$ is illuminated by a parallel beam $R_{51}$ for the diffraction from the grating $G_5$. Mirrors $M_{51}$ and $M_{52}$ and a beam splitter $B_5$ fold the diffracted beams of $p$-order (with a diffraction angle Op) and $q$-order (with a diffraction angle Oq). When the grating $G_5$ has a large effective grating constant N, the objective beams $R_{52}$ are easily extracted from the diffracted beams even at the folding position so that the fringe which varies depending on the grating movement is observed at the folding position.

On the contrary, when the grating $G_5$ has a small effective grating constant, an extracting means should be provided to extract the objective beams $R_{52}$.

In FIG. 11, a lens $L_5$ and an extracting plate $E_5$ at the focus of the lens $L_5$, having a pinhole $A_5$ are used for the above extraction. $F_5$ is supposed to be a film or view screen. The arrangement shown in FIG. 11 has an accuracy $\|p - q\|$ times higher than that of the conventional Moire method.

For the folding of the objective beams, a grating $B_{61}$ may be used instead of the mirrors $M_{51}$ and $M_{52}$ and the beam splitter $B_5$ as shown in FIG. 12. A grating $G_6$ under the detection of movement is illuminated by a parallel beam $R_{61}$ and a number of diffracted beams from the grating $G_6$ pass through a lens $C_6$ and the pair of objective beams are permitted to pass through small holes $A_{61}$ and $A_{62}$ of the extracting plating $E_6$, thus extracted pair of beams pass through a lens $L_6$ into a pair of parallel beams. As this pair of parallel beams has a different direction, and the beams are folded by the grating $B_{61}$. This grating $B_{61}$ also diffracts a number of diffracted waves, and therefore a lens $B_{62}$ and a pinhole $B_{63}$ are prepared for the extraction of the objective beams. Desired fringes are observed behind the pinhole $B_{63}$.

For improvement of fringe contrast objective beams having a symmetrical relationship with each other are desired.

In the modification shown in FIG. 13, a grating $G_7$ for the measurement is illustrated by a pair of parallel beams obtained through a beam splitter $B_7$ and mirrors $M_{71}$ and $M_{72}$. Illumination angles should be so selected that the diffracted objective beams are folded in a parallel beam $R_{72}$. The folded objective beams $R_{72}$ are extracted with the aid of the lens $L_7$ and an extracting plate $E_7$ having a pinhole $A_7$ to obtain fringes for observation. $R_{71}$ is a parallel beam for the illumination.

Also by controlling intensity of the pair of illumination beams, improvement of the fringe contrast is obtained. The term grating used herein is not limited to a diffraction grating but includes one of periodic spatial construction in optical length.

While specific embodiments of the invention have been shown and described in detail to illustrate the application of the inventive principles, it will be understood that the invention may be embodied otherwise without departing from such principles.

What is claimed is:

1. An apparatus for measuring rotation of an object, comprising means for forming a coherent beam, a diffraction grating member mounted on the object and having a plurality of equally spaced grating areas each containing a one dimensional grating, the gratings and successive areas being oriented at angles relative to each other, means for rotating the grating member and the object around a given axis and within the plane of the member, focusing means optically coupled to said grating member for focusing waveforms from the grating member, a focusing plane at the focus of the focusing means, and measuring means at the focal plane for measuring the rotation of the pattern formed by said focusing means and said grating member.

2. An apparatus as in claim 1, wherein $N$ separate grating areas are formed on the grating member and in which the inclinations of the grating on the successive areas of the grating member differ progressively by $360/N$ from one grating, $N$ being greater than 1.

3. An apparatus as defined in claim 1, wherein the areas on the grating member are spaced by equal angular intervals around an axis of the grating member.

4. An apparatus as in claim 1, wherein said measuring means includes optical sensing means in the plane for measuring the recurrence of a point on the pattern as it moves past one point on the plane.

* * * * *

UNITED STATES PATENT OFFICE
CERTIFICATE OF CORRECTION

Patent No. 3,836,257              Dated September 17, 1974

Inventor(s) Kazuya Matsumoto

It is certified that error appears in the above-identified patent and that said Letters Patent are hereby corrected as shown below:

In the heading of the patent, insert:

--[30]          Foreign Application Priority Data

January 7, 1970 Japan..................sho 45- 2455
    January 30, 1970 Japan..................sho 45- 8727
    March 2, 1970 Japan..................sho 45-18081.--

Signed and sealed this 3rd day of December 1974.

(SEAL)
Attest:

McCOY M. GIBSON JR.　　　　　　　　　C. MARSHALL DANN
Attesting Officer　　　　　　　　　　Commissioner of Patents